United States Patent [19]
Assmus

[11] 3,913,313
[45] Oct. 21, 1975

[54] HAND MOUNTING APPARATUS FOR A CLOCK

[75] Inventor: Friedrich Assmus, Schramberg, Germany

[73] Assignee: Gebruder Junghans GmbH, Germany

[22] Filed: Feb. 11, 1975

[21] Appl. No.: 549,102

[30] Foreign Application Priority Data
Feb. 28, 1974 Germany............... 7406972[U]

[52] U.S. Cl. ................................. 58/138; 58/138
[51] Int. Cl.² ................................... G04B 13/02
[58] Field of Search ............. 58/126 D, 138, 140 R; 29/177

[56] References Cited
UNITED STATES PATENTS
2,952,118  9/1960  Rueger.................................. 58/138
FOREIGN PATENTS OR APPLICATIONS
586,401  3/1925  France................................. 58/138

Primary Examiner—George H. Miller, Jr.
Attorney, Agent, or Firm—Burns, Doane, Swecker & Mathis

[57] ABSTRACT

A clock hand is mounted on a hollow shaft, the hollow shaft being driven to operate the hand. The hollow shaft includes a driven end and a hand-mounting end. The hand-mounting end includes screw threads for receiving a nut. The nut is attached to the hand-mounting end in force fit securement to secure the hand to the hollow shaft. This force fit securement imposes forces on the hollow shaft tending to deform it. The hollow shaft comprises a pair of interconnected sections formed of materials of different strengths. A first of these sections defines the driven end of the hollow shaft and is formed of plastic. The other of these sections defines the hand-mounting end and is formed of brass to effectively resist the deforming forces imposed by the nut.

5 Claims, 5 Drawing Figures

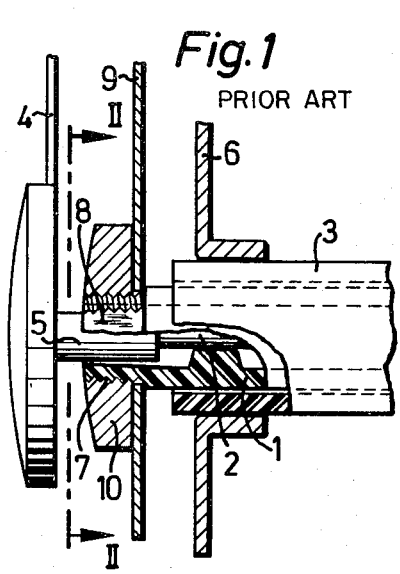
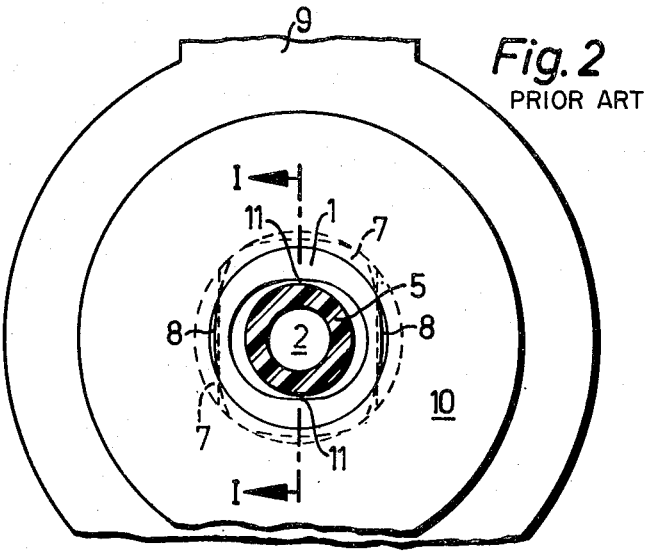
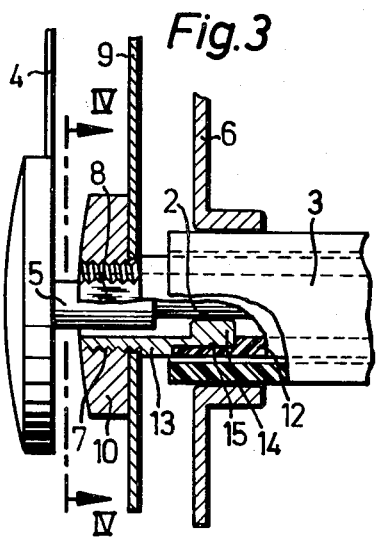
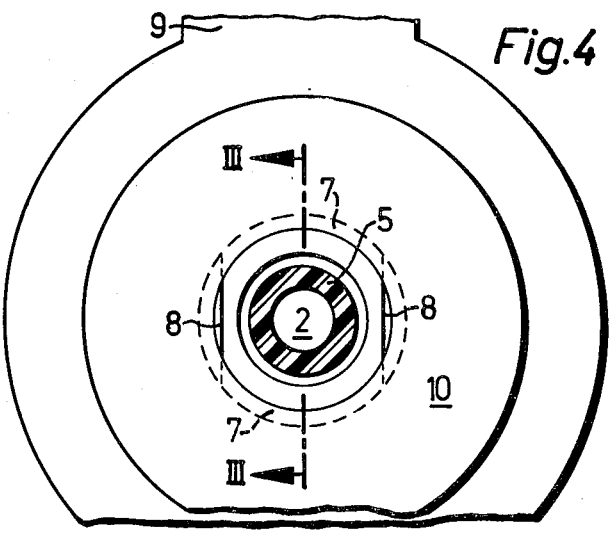
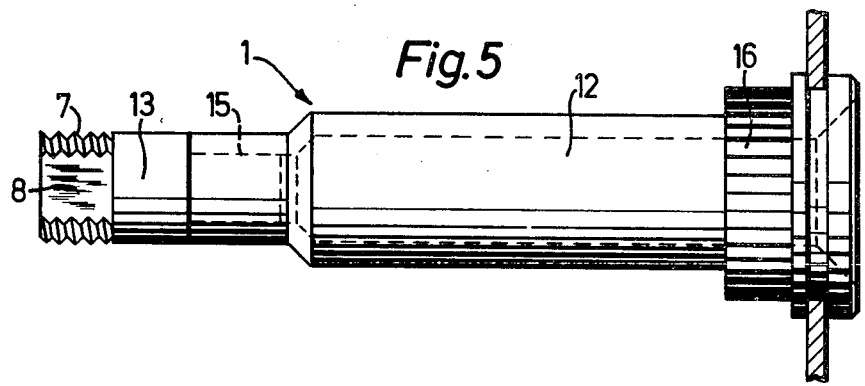

HAND MOUNTING APPARATUS FOR A CLOCK

BACKGROUND AND OBJECTS OF THE INVENTION

The present invention relates to a clock. More particularly, the invention relates to a hollow shaft which mounts and drives an indicator or hand of a clock. Normally, an additional shaft is guided through the hollow shaft. At one end of the hollow shaft a driving serration has been formed and at the other end the hand is attached by means of a connection which involves a force-fit connection. This connection usually consists of a thread interrupted by planar surfaces and of a nut for holding the hand. The nut is usually screwed onto the hollow shaft in a force-fit manner to clamp the hand against the hollow shaft.

Such hollow shaft for indicators customarily consist of brass. Whenever such as brass shaft is replaced by a corresponding plastic part, imprecisions in running often occur. It was found that these imprecisions in running are due to the fact that during the production of the forcefit connection that clamps the indicator to one end of the hollow shaft, deformations of the plastic part occur. Such deformations can result in the fact that the inside wall of the hollow shaft presses against the other shaft being guided through the hollow shaft, or that the other shaft, in the case of rotation, grazes against the inside wall of the hollow shaft.

In the case of the arrangement described in the U.S. Pat. No. 2,952,118, these difficulties do not occur since in that case one starts out from the fact that the hollow shaft was sufficiently strongly dimensioned so that the fixing of the indicator on the hollow shaft was not accompanied by any harmful deformation.

It is one object of the invention to provide an indicator connection which avoids or minimizes these problems.

It is another object of the invention to create a hollow shaft for an indicator wherein the advantages of a plastic part are achieved, while avoiding a deformation of the plastic part in spite of a force-fit connection of the indicator to the hollow shaft. This is to be achieved without there being any need for changing the thickness of the wall of the plastic part, or the diameter of the other shaft guided through the hollow shaft, when compared to the metal shafts used hitherto.

BRIEF SUMMARY OF A PREFERRED EMBODIMENT OF THE INVENTION

According to the invention, the above-mentioned objects are solved by the fact that the hollow shaft is formed in part by a plastic section and in part by a different material which can be less easily deformed than the plastic material of the plastic section. The different material is utilized at the section where a nut is received in a force-fit for securing the indicator. In a preferred embodiment the force-fit part of the hollow shaft consists of brass, with the plastic part being an injection molded part.

THE DRAWING

In FIGS. 1 and 2, a prior art indicator-mounting assembly is depicted to demonstrate difficulties which occur whenever a one-piece plastic part is used as a hollow shaft for the minute hand. These difficulties are avoided by the present invention. More particularly:

FIG. 1 shows a side, partial longitudinal sectional view of a prior art mounting arrangement for the hands of a watch taken along the line I—I of FIG. 2;

FIG. 2 is a cross-sectional view along the line II—II of FIG. 1 at an enlarged scale.

In FIGS. 3–5, a preferred embodiment of the present invention is shown by way of example. From this embodiment by way of example advantageous further developments of the invention result. In detail:

FIG. 3 shows a side, partial longitudinal sectional view of an indicator-mounting arrangement of the present invention taken along the line III—III of FIG. 4;

FIG. 4 is a cross-sectional view taken along the line IV—IV of FIG. 3, in enlarged scale, and FIG. 5 is a side view of the whole hollow shaft according to the invention.

DETAILED DESCRIPTION OF THE PREFERRED EMBODIMENT

FIGS. 1 and 2 depict a prior art arrangement for mounting the indicator hands of a clock, wherein certain plastic components are used. A hollow shaft 1 is provided for running the minute hand 9. A shaft 2 for driving the second hand 4 is mounted so as to be guided through the hollow shaft 1. The hollow shaft 1 is enclosed by a hollow shaft 3 for driving the hour hand 6. The second hand 4 is drivingly mounted on the second shaft 2. The hand 4, for this purpose, is provided with an adapter bushing 5 which attaches to the shaft 2. The hour hand 6 is drivingly attached to the hollow shaft 3.

The hollow shaft 1 of the minute hand has at its free end a thread 7. This thread is interrupted by two parallel plane surfaces 8. As a result of this, a minute hand 9 provided with a correspondingly shaped recess can be mounted on the hollow shaft 1 without being able to twist with respect to the hollow shaft 1. The minute hand 9 is held on the hollow shaft 1 by means of a nut 10. The nut 10, usually made of metal such as brass, is dimensioned such that it is to be screwed onto the thread 7 to clamp the hand 9 against the hollow shaft 1 to create a clamped seating connection therebetween and create a force-fit engagement with the threads 7 to ensure that the nut 10 cannot be untwisted involuntarily.

Whenever the hollow shaft is made of brass, then no further difficulties generally occur. If on the other hand, in order to make the watch less expensive, a plastic material is used for the hollow shaft, then the force-fit securement of the indicator nut 10 on the hollow shaft leads to the difficulty that the hollow shaft 1 will be compressively deformed in the area of the thread 7, as shown in FIG. 2. This deformation can be so considerable, that the adapter bushing 5 attached on the second hand shaft 2 touches against the inside of the hollow shaft 1 in the areas designated by the numerals 11.

According to the present invention (FIGS. 3–5), the hollow shaft 1 for the minute hand is formed in part by a plastic section 12 and in part by a force-fit section 13 firmly connected with the former. On the force-fit section 13, the thread 7 and the plane surfaces 8 are disposed. The force-fit section 13 has been fixedly connected in the plastic section 12. At the same time, the adjoining outside peripheral surfaces of the plastic section 12 and of the force-fit section 13 are in alignment, i.e. are contiguous.

The force-fit section 13 includes a bearing part 14 on its inside periphery, which part 14 serves to rotatably receive the second hand shaft 2. The force-fit section 13 consists of a material which is different from that of the plastic section 12 and which is less susceptible of deformation. Preferably metal, especially brass, is utilized to fabricate section 13. Section 13 is pressed into the plastic section 12 or injected into it. In an advantageous development, the plastic section 12 and the force-fit section 13 include an additional positive connection. This can be achieved for example by providing knurls in the area of the periphery 15 of the force-fit section 13 which project against the plastic section 12.

At the end of the plastic section 12 facing away from the force-fit section 13, a serrated driving section 16 has been provided. This can be developed during the injection molding process which forms the plastic section 12. The serrated driving section can be placed in engagement with a driving element which drives the minute hand 9.

The plastic section 12 is of sufficient strength and rigidity to be driven by a conventional hand-driving mechanism and to transmit rotary drive forces to the force-fit section 13. The force-fit section 13, being stronger than the plastic section 12, carries the minute hand 9 and the usual nut 10 while effectively resisting deformation by the nut. As a result, an economical, yet trouble-resisting, assembly is provided for mounting the hand 9.

SUMMARY OF MAJOR ADVANTAGES AND SCOPE OF THE INVENTION

The novel hand-carrying shaft 1 described previously solves a serious problem at minimal cost and without requiring dimensional changes in the clock component. The minute hand hollow shaft 1 according to the invention is considerably less expensive in its production than a corresponding part made wholly of metal, and involves no deformation problems. Such a shaft requires no changes of dimensions which have been prescribed for wholly metal hollow shafts. Thus, a cheaper minute hand hollow shaft can be exchanged for an all-metal shaft without experiencing troublesome deformations.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:
1. A clock hand mounting apparatus comprising:
    a hollow shaft;
        one end of said hollow shaft including a serrated section suitable for being driven;
        the other end of said hollow shaft including screw threads and planar surfaces interrupting said screw threads;
    a first clock hand having a recess corresponding to the shape of said other shaft end and being mounted thereon so as to be non-rotative relative to said hollow shaft;
    another shaft extending through said hollow shaft for supporting a second clock hand;
    a threaded nut being threadedly attached to said screw threads in force-fit securement to secure said first hand on said hollow shaft;
        said force-fit securement of said nut imposing forces on said other shaft end tending to deform said other shaft end;
    said hollow shaft comprising at least first and second interconnected sections formed of materials of different strengths;
        said first shaft section defines said one shaft end and is formed of plastic material; and
        said second shaft section defines said other shaft end and is formed of a material less susceptible to deformation that the plastic material of said first section, to effectively resist deformation of said other shaft by said nut.

2. Apparatus according to claim 1 wherein said first and second shaft sections are firmly coupled together by a positive connection.

3. Apparatus according to claim 1 wherein said second shaft section includes an interior bearing portion formed on an inside wall of said second shaft section to rotatably support said other shaft.

4. Apparatus according to claim 1 wherein said first section comprises an injection-molded plastic part.

5. A clock hand mounting apparatus comprising:
    a hollow shaft;
        one end of said hollow shaft including a serrated section suitable for being driven;
        the other end of said hollow shaft including screw threads and planar surfaces interrupting said screw threads;
    a first clock hand having a recess corresponding to the shape of said other shaft end and being mounted thereon so as to be non-rotative relative to said hollow shaft;
    another shaft extending through said hollow shaft for supporting a second clock hand;
    a threaded nut being threadedly attached to said screw threads in force-fit securement to secure said first hand on said hollow shaft;
        said force-fit securement of said nut imposing forces on said other shaft end tending to deform said other shaft end;
    said hollow shaft comprising at least first and second interconnected sections formed of materials of different strengths;
        said first shaft section defines said one shaft end and is formed of plastic material; and
        said second shaft section defines said other shaft end and is formed of brass to effectively resist deformation of said other shaft end by said nut.

* * * * *